United States Patent [19]

Marsee

[11] 4,096,843
[45] Jun. 27, 1978

[54] STARTING SYSTEM

[75] Inventor: Frederick J. Marsee, Clawson, Mich.

[73] Assignee: Ethyl Corporation, Richmond, Va.

[21] Appl. No.: 614,856

[22] Filed: Sep. 19, 1975

Related U.S. Application Data

[63] Continuation-in-part of Ser. No. 370,665, Jun. 18, 1973, abandoned, which is a continuation-in-part of Ser. No. 261,665, Jun. 12, 1972, abandoned.

[51] Int. Cl.² .............................................. F02N 17/00
[52] U.S. Cl. ............................. 123/179 A; 123/117 A; 123/179 G
[58] Field of Search .......... 123/117 R, 117 A, 179 B, 123/179 A, 179 BG, 179 G, 146.5 A

[56] References Cited

U.S. PATENT DOCUMENTS

| | | | |
|---|---|---|---|
| 2,809,619 | 10/1957 | Norris | 123/117 R |
| 2,979,047 | 4/1961 | Rapplean et al. | 123/119 F |
| 3,156,228 | 11/1964 | Blackwood | 123/146.5 A |
| 3,547,089 | 12/1970 | Pierlot | 123/117 A |
| 3,646,921 | 3/1972 | Marsee | 123/117 A |
| 3,680,533 | 8/1972 | Soberski | 123/117 R |
| 3,687,120 | 8/1972 | Lenz | 123/146.5 A |
| 3,776,205 | 12/1973 | Marvoka | 123/179 BG |
| 3,791,358 | 2/1974 | Masahi et al. | 123/117 R |
| 3,793,833 | 2/1974 | Van Basshuysen | 123/117 A |

Primary Examiner—Ronald H. Lazarus
Assistant Examiner—David D. Reynolds
Attorney, Agent, or Firm—Donald L. Johnson; Robert A. Linn; Willard G. Montgomery

[57] ABSTRACT

A system for improving the starting characteristics of an internal combustion engine is described. The system effects reduced exhaust emissions, especially for engines having thermal reactor and/or exhaust catalyst components. The system comprises a carburetor having throttle means operatively connected to first control means for simultaneously (1) opening said throttle means to obtain engine speed substantially higher than normal starting speed and (ii) retarding spark advance, on starting said engine, said means acting to maintain said engine speed and spark retard for a predetermined time after starting.

10 Claims, 7 Drawing Figures

STARTING SYSTEM

CROSS-REFERENCE TO RELATED APPLICATIONS

This application is a Continuation-in-Part of application Ser. No. 370,665, filed June 18, 1973, now abandoned which in turn is a Continuation-in-Part of application Ser. No. 261,665, filed June 12, 1972, now abandoned.

BACKGROUND OF THE INVENTION

The present invention involves engine modification which results in reduced exhaust emissions. The modification alters the start and warm-up characteristics of the engine.

Exhaust emissions on start and during early warm-up of an internal combustion engine are substantially higher than those from the engine after it has warmed up. This is especially true with engines equipped with exhaust emission reducing components, such as thermal reactor and/or exhaust catalysts.

The present invention provides a novel system for improving the start and warm-up characteristics of an engine. This system effects a substantial reduction in exhaust emissions during this portion of the engine operating cycle.

SUMMARY OF THE INVENTION

A system for reducing exhaust emissions from a spark ignition, internal combustion engine during the start and warm-up operating mode which features means for simultaneously (1) setting the engine throttle to obtain an engine speed substantially higher than at idle, and (2) retarding spark advance, for a predetermined period of time and then allowing the engine to return to normal starting and operating conditions.

DESCRIPTION OF PREFERRED EMBODIMENTS

The present invention provides a system for reducing exhaust emissions from an internal combustion engine by improving the start and warm-up characteristics of the engine. This system is embodied in means for simultaneously running the engine at a speed substantially higher than idle speed, and retarding the spark advance, maintaining this engine speed and spark retard for a predetermined time after starting, and subsequently allowing the engine to return to normal starting and operating conditions. This control means can be made responsive to vacuum signal, electrical signal, or combination of both. In a more preferred embodiment, the control means is provided with a lock-out means, which overrides the first control means when driving circumstances warrant.

This system can be used with any spark ignition, internal combustion engine which utilizes a carburetor-/intake manifold induction system. The system is especially effective with engines having thermal reactors and/or exhaust catalysts to reduce exhaust emissions.

A thorough understanding of the present system will be obtained by considering the various embodiments illustrated in the aforesaid drawings. (The drawings are not to scale.)

Figure 1:
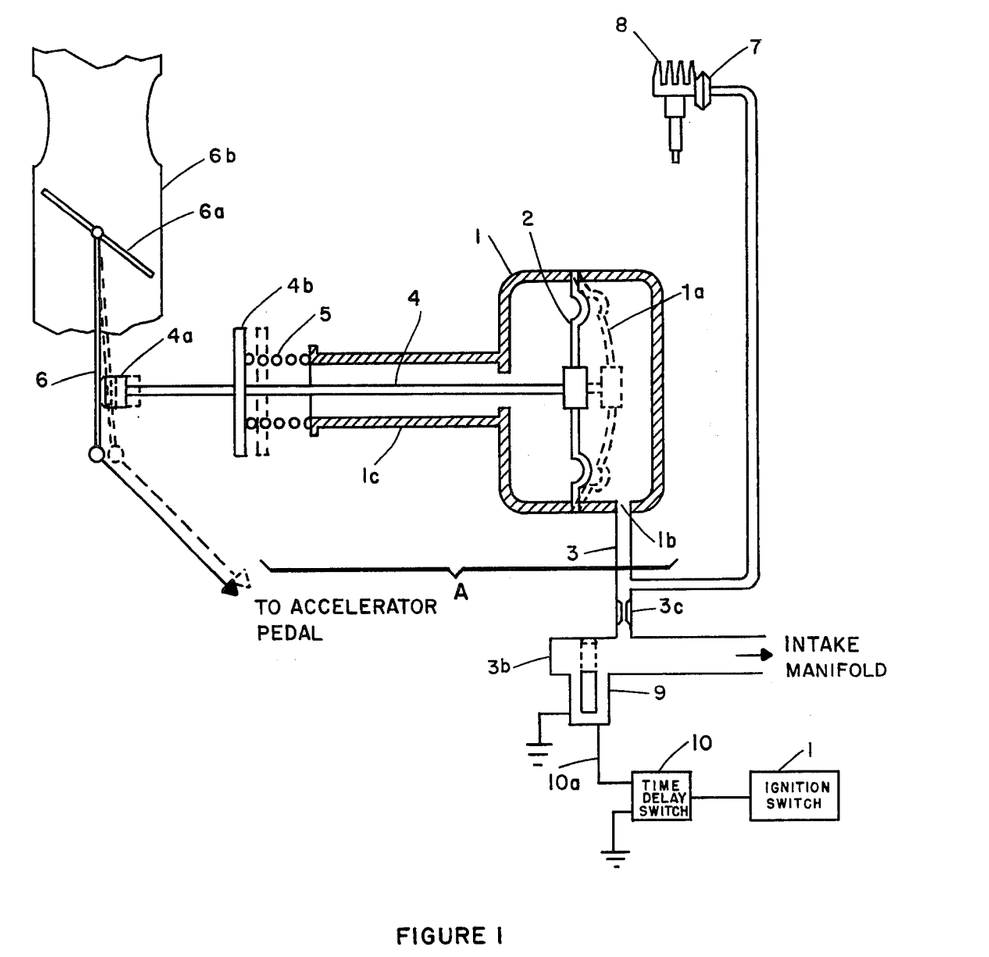
FIG. 1 is a schematic illustration of a starting system of the present invention. The first control means is shown in partial section.

FIG. 1 is a schematic illustration of an embodiment of the present starting system; a throttle position control device (first control means) is shown in partial section. The throttle position control device A comprises a housing 1 having a diaphragm 2 which define a chamber 1a in communication via opening 1b with conduit 3. Conduit 3 leads to the intake manifold (not shown) as a vacuum source. Attached to the diaphragm 2 is a control element 4. The control element 4 has a nose 4a and collar 4b. A spring 5 is positioned between the collar 4b and a sleeve 1c which extends from the housing 1. This device A is mounted on the engine (not shown) so that the control element nose 4a can contact the rod 6 which is connected to the throttle means 6a in the carburetor barrel 6b (the carburetor itself is not shown). The conduit 3 also serves to supply vacuum to the vacuum advance unit 7 of the distributor 8. A valve 9 is positioned in the conduit 3 between the opening 1b and the intake manifold (not shown). This valve 9 is shown as a solenoid control valve. In series with this valve 9 is a time-delay switch 10 which is in series with and activated by the ignition switch 11 when it is turned to the engine start position.

The system of FIG. 1 operates as follows. The position control device A is set so that when the engine is cold the throttle means 6a is held open a predetermined amount by the position of the nose 4a held against the control rod 6. This position of the nose 4a is maintained by the spring 5. When the ignition switch 11 is closed (turned to engine start position), the time-delay switch holds the circuit 10a open and the solenoid valve 9 is open. Thus, the conduit 3 is open to the atmosphere at 3b and when the engine is started there is no manifold vacuum signal available to the chamber 1a or the vacuum advance unit 7. Since the throttle is open, the engine is running at very high speed (1200 rpm or higher) under no load; and since the vacuum advance unit 7 is inactivated, the spark is in effect retarded. When the time-delay switch 10 closes (time predetermined, generally less than one minute), the valve 9 is activated and moves to the closed position (shown in phantom). This seals the opening 3b and permits manifold vacuum to act on the diaphragm 2, causing it to move to the position shown in phantom. This movement pulls the nose 4a, the collar 4b, and the control element 4 back (position shown in phantom) from the rod 6, returning the throttle to normal engine control position. At the same time, the vacuum advance unit 7 is activated and exerts normal spark advance control. As long as the engine is running after the time-delay switch has closed, the present starting system is held in the inactive position.

In order to minimize vacuum surge effect in the spark advance unit 7 and the control unit A when the solenoid valve 9 does close, a constriction 3c is placed in conduit 3 downstream from the control unit A and the vacuum advance unit 7.

Figure 1A:
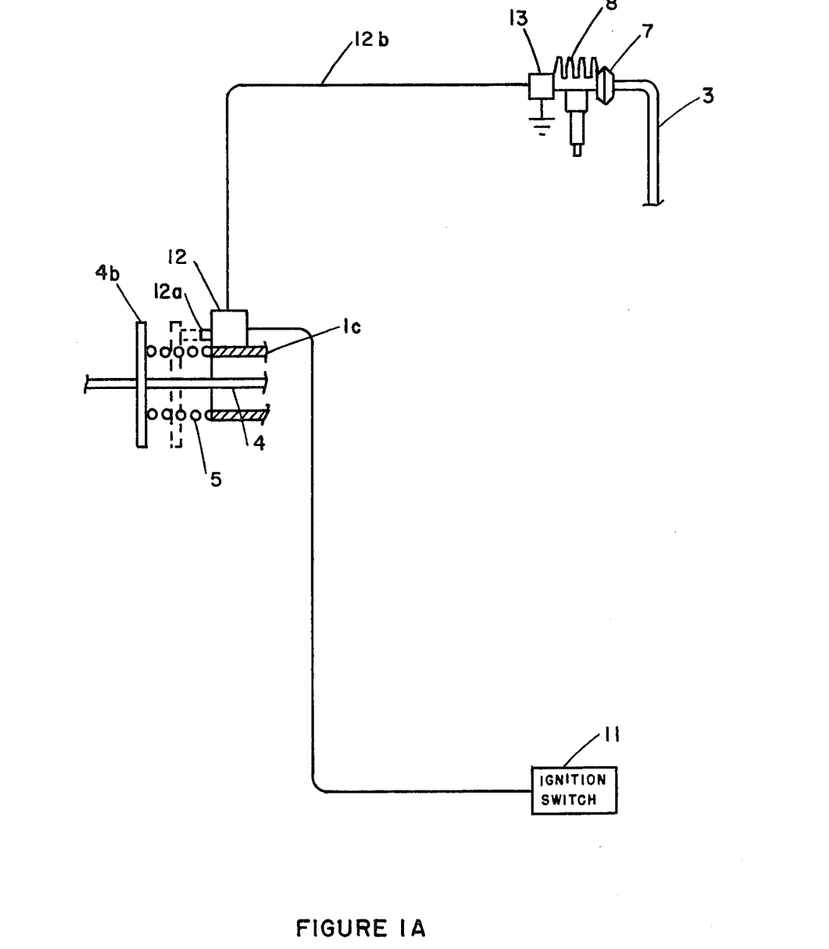
FIG. 1A is a schematic illustration of a portion of the FIG. 1 system showing a control arrangement for the distributor mechanical advance.

FIG. 1A illustrates a portion of the FIG. 1 system showing a distributor mechanical advance control arrangement. This control is a microswitch 12 which is positioned on sleeve 1c. This microswitch 12 is activated by the ignition switch 11. The microswitch in turn is connected to controller 13 which is operatively connected to the mechanical (centrifugal) advance (not shown) in the distributor 8. With this additional control feature, when the engine is started cold, both the vacuum advance unit 7 and the mechanical advance mechanism (not shown) are inactive. When the time-delay switch 10 moves to the open position, the vacuum advance unit 7 is activated (see FIG. 1 description above) and the collar 4b moves back (position shown in phantom) and contacts the switch button 12a which opens switch 12, breaking circuit 12b and disconnecting controller 13, thus activating the mechanical advance mechanism in the distributor 8. With this added control feature, a greater degree of spark retard is effected.

Figure 1B:
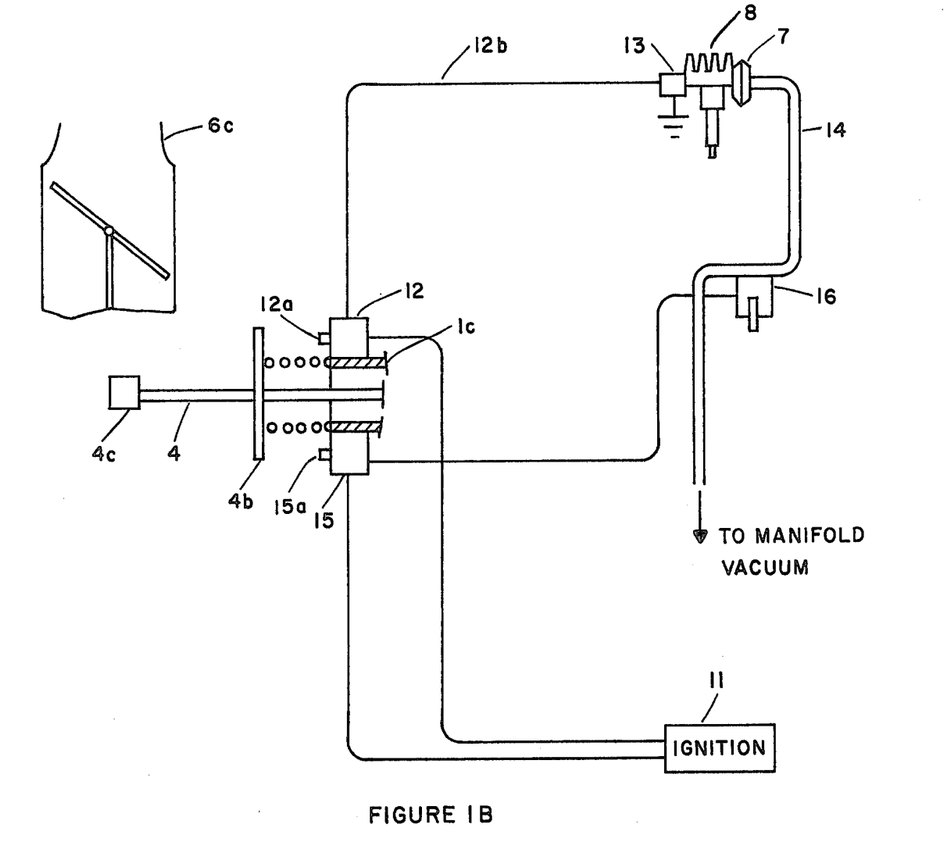
FIG. 1B is a schematic illustration of a portion of the FIG. 1 system showing distributor mechanical advance control.

FIG. 1B illustrates an alternate arrangement for controlling vacuum advance in a FIG. 1A (or FIG. 1) system. A separate conduit 14 is provided to supply vacuum to the vacuum advance unit 7. This conduit 14 can be connected to the intake manifold (not shown) or to an opening 6c in the carburetor barrel venturi. (The venturi vacuum conduit 14a is shown in phantom). When using such a separate conduit to provide vacuum to the vacuum advance unit, a second microswitch 15 is also positioned on sleeve 1c. A second valve 16 is also placed in the conduit 14. This valve 16 is open when the ignition switch is turned on. After the time-delay switch moves to the on position, the collar 4b moves back and contacts both microswitch button 12a and microswitch button 15a, causing both the vacuum advance and mechanical advance to be activated. The advantage of using such a separate conduit to supply vacuum to the vacuum advance unit is that it permits the convenient use of the present system with any vacuum advance distributor arrangement.

Figure 1C:
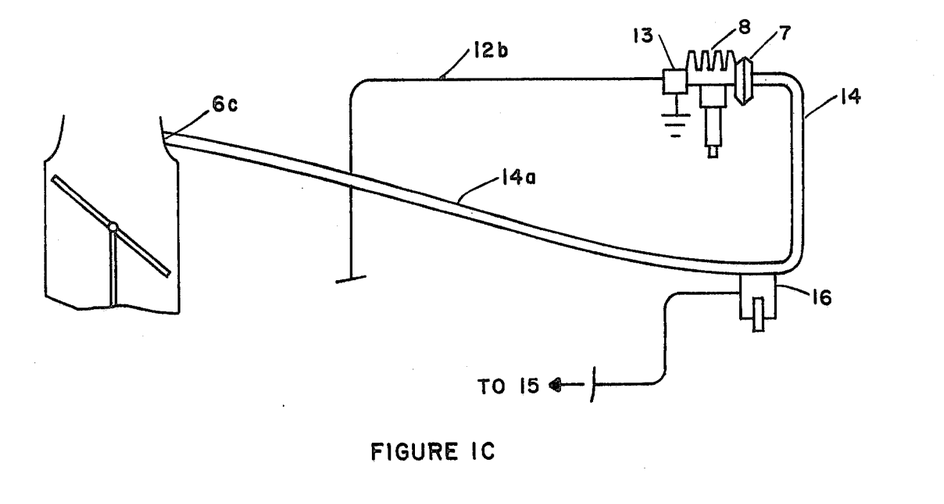
FIG. 1C is a schematic illustration of a portion of FIG. 1B showing an alternate vacuum advance source.

FIG. 1C illustrates a portion of the FIG. 1B system. The vacuum supply to the vacuum advance unit 7 is obtained via conduit 14 from the carburetor barrel venturi through opening 6c. Except for this change is spark advance vacuum source, the control means operates in the same manner as the FIG. 1B system.

Figure 2:
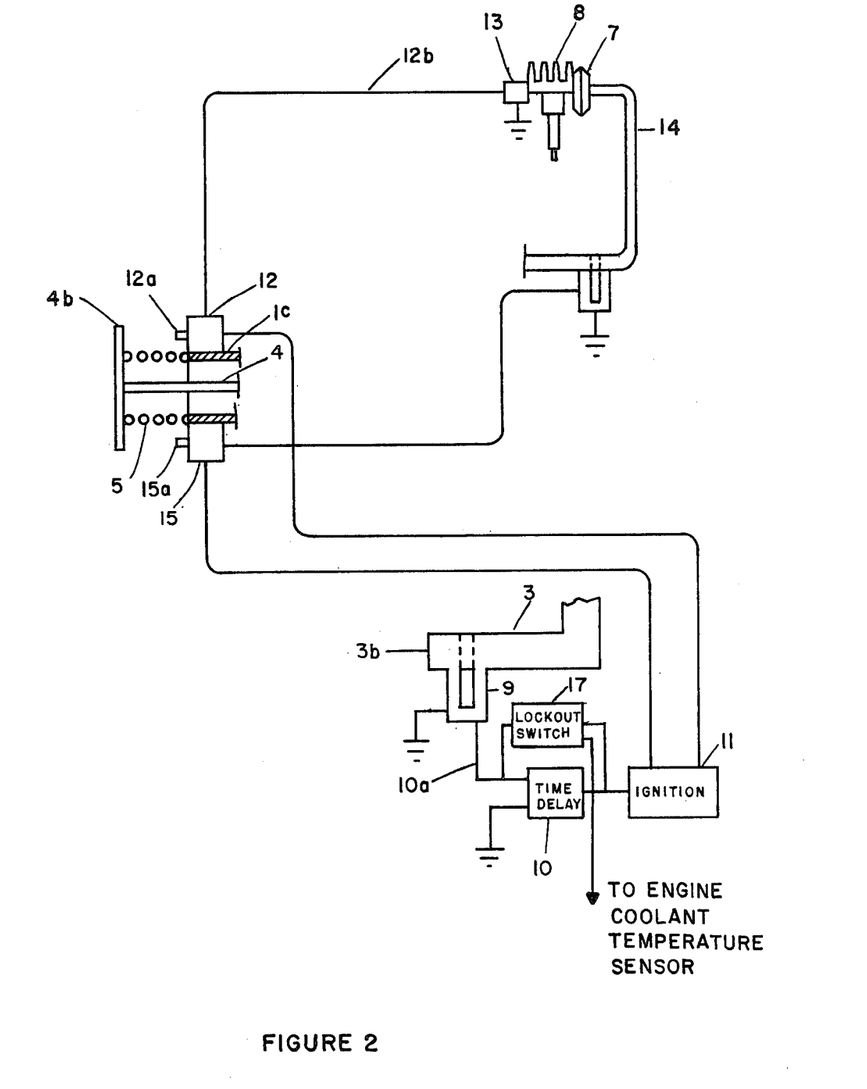
FIG. 2 is a schematic illustration of a portion of the FIG. 1 system showing a lock-out control arrangement.

FIG. 2 illustrates the system of FIG. 1B with a lock-out control. The lock-out control inactivates or by-passes the present starting system after the engine has attained a certain condition or after a certain amount of time has elapsed after cold start. The lock-out control is embodied in a second switch 17 which is placed in the circuit parallel with the time-delay switch 10. This second switch 18 is responsive to a signal obtained from a temperature sensor (not shown) in the engine cooling system. When a certain "warm" cooling system temperature is attained, switch 17 closes and remains closed until the engine cooling system temperature falls below this "warm" temperature. When switch 17 closes, the time-delay switch 10 is by-passed, valve 9 seals off (shown in phantom) opening 3b and the throttle and distributor control of the present starting system are inactivated, while the ignition is turned on.

Although the lock-out system illustrated in FIG. 2 is responsive to an engine cooling system temperature, it can be made responsive to other engine condition indicators, for example, lubricating oil temperature, lubricating oil pressure; or the lock-out system control could be embodied in a second time-delay switch which closes and by-passes the first time-delay switch 10 after a predetermined engine operation time, for example, after two or three minutes. This second time-delay switch could also be made to open after a 15-minute delay or other extended periods of time.

This lock-out control inactivates or by-passes the present starting system when it is not needed (that is, when the engine is warm) and provides a feature which improves the safety of operation of an automobile equipped with an engine having the present starting system. For example, if the automobile engine were to stall in traffic, without a lock-out control, on restarting the engine, the present starting system would be activated and the engine would have to run through the high speed, no load cold start mode before being returned to normal engine operating control. This in itself is not unsafe, but the automobile operator, in his haste to move the vehicle in traffic, might attempt to put the automobile into gear too quickly, which could result in (1) damage to the gear train and/or engine, or (2) lead to a rapid, uncontrolled movement of the automobile. Either of these eventualities can be costly or can create a safety hazard. The lock-out control provision is positive protection against these potential problems.

Figure 3:
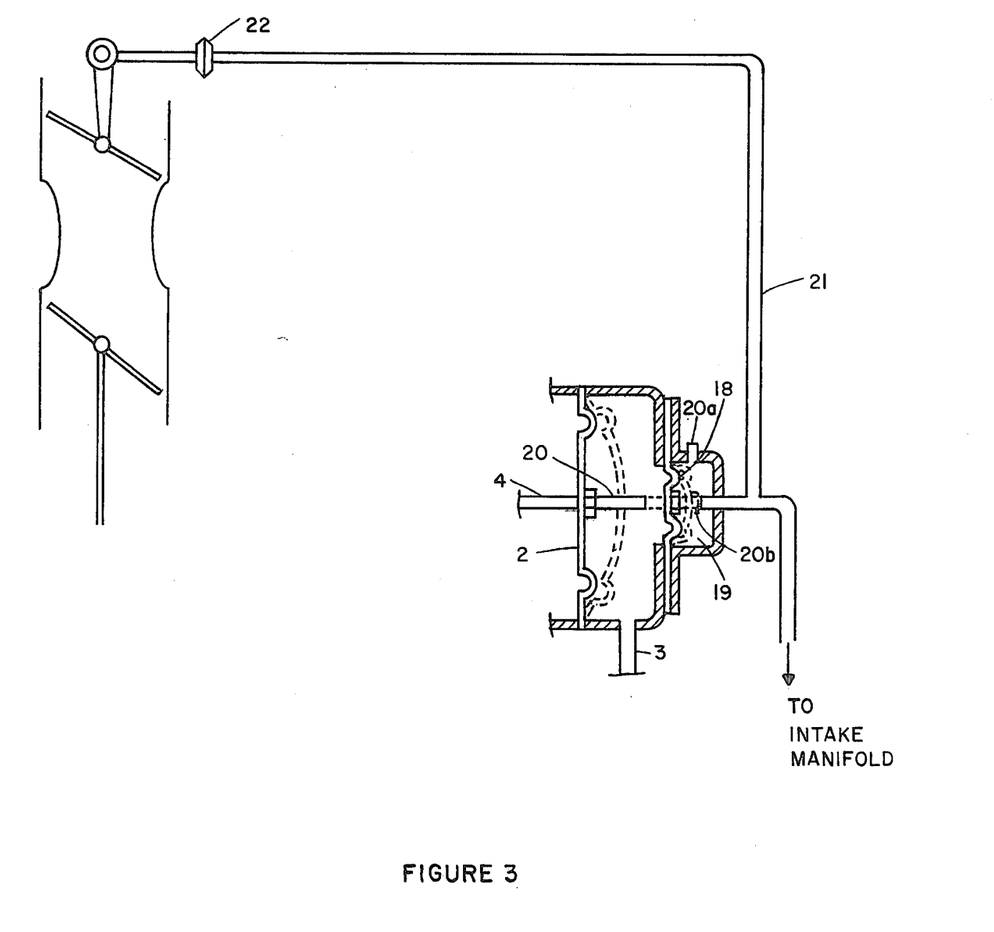
FIG. 3 is a schematic illustration of a portion of the FIG. 1 system showing a choke vacuum control modulation means.

FIG. 3 is a schematic illustration of the starting system illustrated in FIG. 1, additionally provided with choke modulation means. This choke modulation is achieved by modifying the position control device A. The position control device A is provided with a second diaphragm 18 and an additional chamber 19. The diaphragm 2 also has an extension rod 20 attached to it. The chamber 19 has one opening 20a (opens to the atmosphere) and an orifice 20b which is connected to conduit 21. Vacuum signal from intake manifold (not shown) is provided the choke vacuum control 22 via conduit 21.

In operation, on starting cold, the starting system of FIG. 3 functions the same as the system in FIG. 1 during the period the time-delay switch 10 is open. When this time-delay switch 10 is open, no vacuum signal reaches the choke vacuum control 22 because of the opening 20a in chamber 20. However, when the time-delay switch 10 closes and vacuum acts on diaphragm 2, the control element 4 moves back (shown in phantom). The extension rod 21 causes diaphragm 19 to move back and seal opening 20b. When this opening 20b is sealed, vacuum signal is provided to the choke vacuum control 22; and the choke control returns to a normal condition. By providing this added means for modulating the choke vacuum control 22 during the initial cold start, engine operation is improved, because the fuel/air mixture is slightly enriched. This is especially useful with the present-day engine arrangements which tend to provide a fairly lean air/fuel mixture on starting. This added feature of choke control can be utilized with equal effectiveness with any of the systems illustrated in FIGS. 1A, 1B, 1C, 2 and FIG. 4 (to be discussed below).

Figure 4:
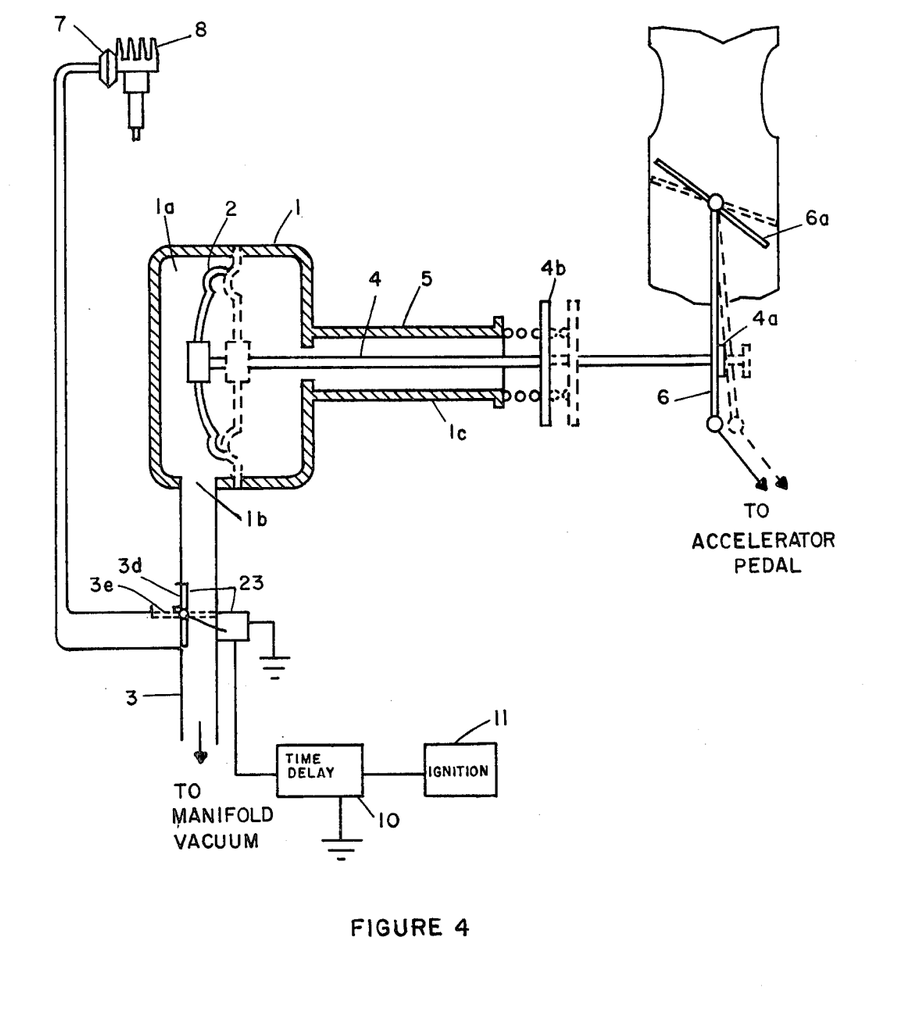
FIG. 4 is a schematic illustration of a starting system of the present invention showing an alternate configuration for the first control means (shown in partial section).

FIG. 4 is a schematic illustration of another starting system arrangement. Its elements are in general the same as those of the FIG. 1 system. It differs in that the control means A is arranged so that engine vacuum is used to activate the control while a mechanical means (a spring) holds the system in the inactive position.

The system illustrated in FIG. 4 operates as follows. When the ignition is turned to the engine start position, the time-delay switch 10 is in the closed position and the circuit to valve 23 is complete. This valve 23 moves to close opening 3d and the branch of conduit 3, leading to the vacuum advance unit 7. The vacuum causes the control element 4 to be moved, against spring 5, causing the nose 4a of the control element 4 to contact the control rod 6 moving the throttle means 6a to the slightly open position. When the time-delay switch 10 opens, the valve 23 moves to the position (shown in phantom) shutting opening 3e and closing off branch of conduit 3 leading to the chamber 1a. The position of all the elements when the time-delay switch opens is shown in phantom. With the elements of the system in the position shown in phantom, engine control returns to normal with a vacuum signal being supplied to the vacuum control unit 7 of the distributor 8. The arrangement of the control elements shown in FIG. 4 can be used with the additional switches and arrangements shown in any of the FIGS. 1A, 1B, 1C, 2 and 3.

In order to demonstrate the effectiveness of the present starting system for reducing exhaust emissions, a series of exhaust emission determinations were made on an automobile equipped with a 360 cubic inch displacement, V-8 engine. The exhaust emissions were determined using the 1975 Federal Test Procedure (published in Federal Register, Volume 36, No. 228, Page 22447, November, 1971). Emission measurements were made on the engine using the conventional starting system. Then, the present starting system (as illustrated in FIG. 1B) was installed on the engine and a series of emission measurements were made. In running the test on the engine equipped with the present starting system, two Start Cycles were used. For Start Cycle 1, the present starting system ran the engine at about 1700 revolutions per minute (rpm) for the initial 10–12 seconds after start; for Start Cycle 2, the present starting system ran the engine at about 3000 rpm for the initial 10–12 seconds after start.

The exhaust emission data obtained from these tests is presented in the following table.

Table 1
Exhaust Emissions Using
1975 Federal Test Procedure

| Test | Engine | Hydrocarbons (g/mile) | CO (g/mile) | $NO_x$ (g/mile) |
|---|---|---|---|---|
| 1 | Engine with standard starting system | 0.6 – 0.7 | 6.4 | 2.0 – 2.2 |
| 2 | Engine with present starting system (Cycle 1) (a) | 0.4 – 0.5 | 5.0 – 6.0 | 2.0 – 2.2 |
| 3 | Engine with present starting system (Cycle 2) (b) | 0.3 | 3.46 | 2.3 |

(a) 1700 rpm/10 – 12 seconds. All other engine controls and settings same as Test 1.
(b) 3000 rpm/10 – 12 seconds. Exhaust recycle adjusted and choke set leaner than Test 2.

The data in Table 1 clearly shows the substantial reduction in hydrocarbon and carbon monoxide emissions effected using the present starting system. The reduction achieved in exhaust hydrocarbons ranged up to about 50°/o; the carbon monoxide (CO) reduction ranged up to about 20°/o; also there was no adverse effect on nitrogen oxides ($NO_x$) emissions. Higher reductions are believed to be possible by adjusting the start cycle and other engine controls and settings.

The start cycle, i.e., engine speed/time delay after start, used in Tests 2 and 3 are illustrative and not meant to be limiting. The start cycle can be varied as required. In practice, the start cycle for a particular engine can be set to achieve lowest exhaust emissions consistent with good engine performance. Different engines and engine systems may require different start cycle settings.

The engine used in all the tests was also equipped with the following elements:
 (a) a heated intake manifold,
 (b) a three-barrel carburetor, having variable venturi secondary section (described in my copending application, Ser. No. 157087, filed June 28, 1971, now U.S. Pat. No. 3,768,787),
 (c) a thermal reactor, and
 (d) an exhaust recycle system.

The starting system of the present invention, however, can be utilized with analogous effectiveness with any internal combustion engine or internal combustion engine system. For example, the engine can be equipped with a catalytic convertor, either in addition to or instead of the thermal reactor, air injection into the exhaust, an exhaust after-burner, etc.

The present starting system has been illustrated in the accompanying figures as being responsive to and controlled by an intake manifold vacuum signal. This is not meant to limit the particular control system. A useful system could also be designed using only electrical control such as solenoid valves in place of the engine vacuum control system. The use of engine vacuum in combination with electrically controlled valves and switches offers a more convenient and practical arrangement.

The engine speed setting used with the present starting system is substantially higher than idle engine speed; and higher than normal engine starting speed. By normal engine starting speed is meant the engine speed attained on starting an engine equipped with present-day conventional starting systems. Since the normal engine starting speeds vary with engine size, type, displacement, design, etc., an exact minimum rpm value or range of values for engine speed settings useful with the present invention cannot be assigned.

Claims to the invention follow.

I claim:
1. A system for improving the warm-up characteristics on cold starting of a spark ignition internal combustion engine which comprises in combination
 (a) a distributor having at least a vacuum actuated spark advance means and a carburetor having throttle means operatively connected to first control means for simultaneously
  (i) opening said throttle means to obtain increased engine speed and
  (ii) retarding spark advance, on starting said engine, said first control means acting to maintain said engine speed and spark retard for a predetermined time after starting, said first control means comprising in combination
   (1) engine vacuum actuated throttle means position control means,
   (2) conduit means in communication at one end thereof with said throttle means position control means and said vacuum actuated spark advance means, and in communication at the other end with the atmosphere and with engine vacuum means,
(3) valve means positioned in said other end of said conduit, said valve means operable to alternatively connect said conduit means to the atmosphere or to said engine vacuum means,
(b) second control means, said second control means acting to lock out said first control means when a predetermined engine condition exists,
whereby a substantial reduction in exhaust emissions is obtained for the cold start engine operating mode.

2. The system of claim 1 wherein said engine vacuum actuated throttle means position control means comprise a housing having a diaphragm therein, said diaphragm defining a chamber which is in communication with said one end of said conduit means and receives a vacuum signal from said engine vacuum means through said conduit, whereby said diaphragm is displaced in response to said vacuum signal.

3. The system of claim 2 wherein said diaphragm has an arm connected thereto and extending therefrom in a direction opposite from said chamber, said arm being operatively engageable with said throttle means to move said throttle means to a predetermined position upon movement of said diaphragm in response to the provision of a vacuum signal to said chamber.

4. The system of claim 3 wherein said first control means include choke modulation means.

5. The system of claim 4 wherein said choke modulation means comprise (i) choke vacuum control means operably connected to choke means for opening said choke means; and (ii) third vacuum actuated control means operably connected to said choke vacuum control means for providing a vacuum signal to said choke vacuum control means simultaneously with the provision of a vacuum signal to said first chamber, whereby said choke vacuum control means are thereby opened simultaneously with the opening of said throttle means.

6. The system of claim 1 wherein said engine condition is engine temperature.

7. The system of claim 3 wherein said first control means include a collar positioned on said arm exteriorly of said housing and biasing means operable between said collar and said housing for biasing said arm in a direction away from said housing, whereby said arm is displaced towards said throttle means and away from said housing to force said throttle means to a predetermined position when no vacuum signal is provided to said chamber.

8. The system of claim 1 wherein said first control means includes timer means for maintaining said engine speed and spark retard for a predetermined time after starting.

9. The system of claim 5 wherein said first control means includes (a) a distributor mechanical advance means, and (b) distributor mechanical advance means control means comprising switch means disposed on said housing and actuated by contact with said collar when said arm is displaced in a direction away from said throttle means and towards said housing in response to the provision of a vacuum signal to said chamber.

10. A system for improving the warm-up characteristics on cold starting of a spark ignition internal combustion engine which comprises in combination
(a) a distributor having at least a vacuum actuated spark advance means and a carburetor having throttle means operatively connected to first vacuum responsive actuating control means said first control means further chracterized as including (i) a distributor mechanical advance means, and (ii) distributor mechanical advance means control means comprising switch means disposed on housing means and actuated by contact with collar means when arm means are displaced in a direction away from said throttle means and towards said housing means in response to the provision of a vacuum signal to chamber means within said housing means for simultaneously opening said throttle means to obtain increased engine speed and retarding spark advance, on starting said engine, said first control means acting to maintain said engine speed and spark retard for a predetermined time after starting,
(b) second control means, said second control means acting to lock out said first control means when a predetermined engine condition exists,
whereby a substantial reduction in exhaust emissions is obtained for the cold start engine operating mode.

* * * * *